(12) United States Patent
Zeng et al.

(10) Patent No.: US 7,859,517 B2
(45) Date of Patent: Dec. 28, 2010

(54) COMPUTER INPUT DEVICE FOR AUTOMATICALLY SCROLLING

(75) Inventors: Yu-Wen Zeng, Taipei (TW); Yu-Qi Wang, Taipei (TW)

(73) Assignee: Kye Systems Corporation, Taipei (TW)

( * ) Notice: Subject to any disclaimer, the term of this patent is extended or adjusted under 35 U.S.C. 154(b) by 901 days.

(21) Appl. No.: 11/797,122

(22) Filed: May 1, 2007

(65) Prior Publication Data
US 2007/0200826 A1    Aug. 30, 2007

Related U.S. Application Data

(63) Continuation-in-part of application No. 10/630,696, filed on Jul. 31, 2003, now Pat. No. 7,298,362.

(30) Foreign Application Priority Data

Apr. 4, 2007    (TW) .............................. 96112118 A

(51) Int. Cl.
*G09G 5/08* (2006.01)

(52) U.S. Cl. ........................ 345/166; 345/158; 345/159; 345/161; 345/163

(58) Field of Classification Search ......... 345/156–170, 345/173, 174, 177, 178, 179, 184; 178/18.01, 178/19.01; 356/28
See application file for complete search history.

(56) References Cited

U.S. PATENT DOCUMENTS 5,530,455 A * 6/1996 Gillick et al. ................ 345/163
6,741,335 B2 * 5/2004 Kinrot et al. .................... 356/28
6,872,931 B2   3/2005 Liess et al.
7,079,110 B2 * 7/2006 Ledbetter et al. ............. 345/156
7,187,358 B2 * 3/2007 Ledbetter et al. ............. 345/156
7,193,612 B2 * 3/2007 Lindhout et al. ............. 345/164
7,511,706 B2 * 3/2009 Schena ........................ 345/179
7,573,463 B2 * 8/2009 Liess ........................... 345/170
RE40,891 E  * 9/2009 Yasutake ..................... 345/173
7,589,709 B2 * 9/2009 Liess et al. ................... 345/157
2003/0020755 A1 * 1/2003 Lemelson et al. ............ 345/786
2005/0024335 A1   2/2005 Wang
2005/0243053 A1 * 11/2005 Liess et al. ................... 345/156
2006/0229856 A1 * 10/2006 Burrus et al. .................. 703/11
2008/0042986 A1 * 2/2008 Westerman et al. ......... 345/173
2009/0184923 A1 * 7/2009 Schena ........................ 345/156

FOREIGN PATENT DOCUMENTS

TW           200712994           9/1994

* cited by examiner

*Primary Examiner*—Prabodh M Dharia
(74) *Attorney, Agent, or Firm*—Bacon & Thomas, PLLC

(57) ABSTRACT

A computer input device includes a body and a trace-detecting module coupled to the body. The body has a micro control unit (MCU), and the trace-detecting module has at least a light pervious area, and a trace-detecting unit. The trace-detecting unit further has at least a light source and a sensor. The sensor senses a reflected light beam caused by movement of a user's digit movement on the light pervious area at a velocity which can be sensed by the sensor. If the velocity exceeds a threshold stored in the MCU, the MCU executes automatically scrolling at a predetermined scrolling speed.

21 Claims, 4 Drawing Sheets

COMPUTER INPUT DEVICE FOR AUTOMATICALLY SCROLLING

This application is a continuation-in-part of U.S. patent application Ser. No. 10/630,696, filed on Jul. 31, 2003, and now patented (U.S. Pat. No. 7,298,362).

BACKGROUND OF THE INVENTION

1. Field of the Invention

The present invention relates to a computer input device and method thereof for scrolling, and in particular to an input device which causes automatic scrolling at a predetermined speed if the velocity of the object exceeds a threshold. The automatic scrolling may be initiated by detection of the variation of a light beam reflected by a moving object, or by a finger-activated mechanism or device such as a traditional scroll wheel.

2. Description of the Prior Art

The so-called "scrolling" function in applications was first introduced in U.S. Pat. No. 5,530,455, which disclosed the roller-like device that is now typically included at the top of a computer mouse. Once the roller is rotated, the non-displayed portion of an application or document can be displayed line-by-line or page-by-page. A rapid turning of the roller generates pulses which are stored in a buffer and interpreted as a scroll command so that scrolling continues until stopped or until the buffer is depleted. However, due to the abundant contents in a website or numerous data within a so-called Excel® program, the traditional way to scroll the contents line-by-line, page-by-page, or by dragging the scrolling bar from the top to the bottom will bring a great suffering to the user's digit or finger.

One possible way to solve the problem is to increase the turning number of the roller. A so-called "fast scroll wheel" is powered by a specially designed mechanism. When a user activates or rotates the wheel, the mechanism will force the wheel to rotate for a predetermined time (for example, the wheel will be rotated for 7 seconds). However, it is difficult to assemble the relating components together in the narrow space.

SUMMARY OF THE INVENTION

It is an objective of the present invention to provide an easy way to scroll an application without raising producing costs.

It is another objective of the present invention to provide a method and device that enables fast scrolling with minimal movement on the part of the user.

It is yet another objective of the present invention to provide a so-called "trace-detecting module" with a fast scrolling function.

To accomplish the objectives mentioned above, the input device according to a preferred embodiment of the present invention includes a body and a trace-detecting module coupled to the body. The body has a micro control unit (MCU), and the trace-detecting module has at least a light pervious area, and a trace-detecting unit. The trace-detecting unit further has at least a light source and a sensor. The sensor senses changes in a reflected light beam caused by movement of a user's digit on the light pervious area at a velocity which can be sensed by the sensor. If the velocity exceeds a threshold stored in the MCU, the MCU executes automatic scrolling at a predetermined scrolling speed.

Those skilled in the art will appreciate that although the preferred embodiment includes an optical trace-detection module, the automatic scrolling effect could be initiated by other movement detection devices, including devices that detect a moving scroll wheel, track ball, joystick, or the like rather than the user's finger.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims. The input device according to the present invention can be a mouse, trackball, game controller or the like. Also, the input device can be applied to a notebook computer, cell phone, personal digital assistant (PDA) or the like. The so-called trace-detecting module according to the present invention is an optical device which may include the skill disclosed in the United States Patent Publication No. 2005/0024335, and U.S. Pat. No. 6,872,931. Alternatively, numerous other types of movement detection devices may be substituted, including other optical trace-detection devices and other movement detection devices in general, such as devices that directly detect a user's finger and other devices that detect the movement of a device, such as a scroll wheel, that is moved by the user's finger or other body part.

Figure 2:
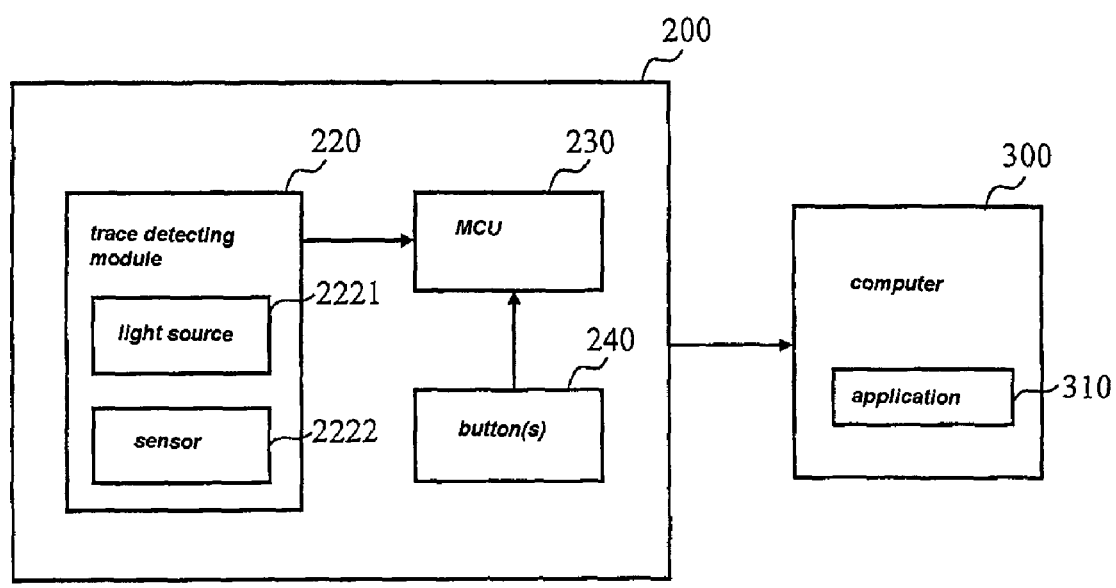
FIG. 2 is a block diagram of the input device coupled to a computer.
Figure 3:
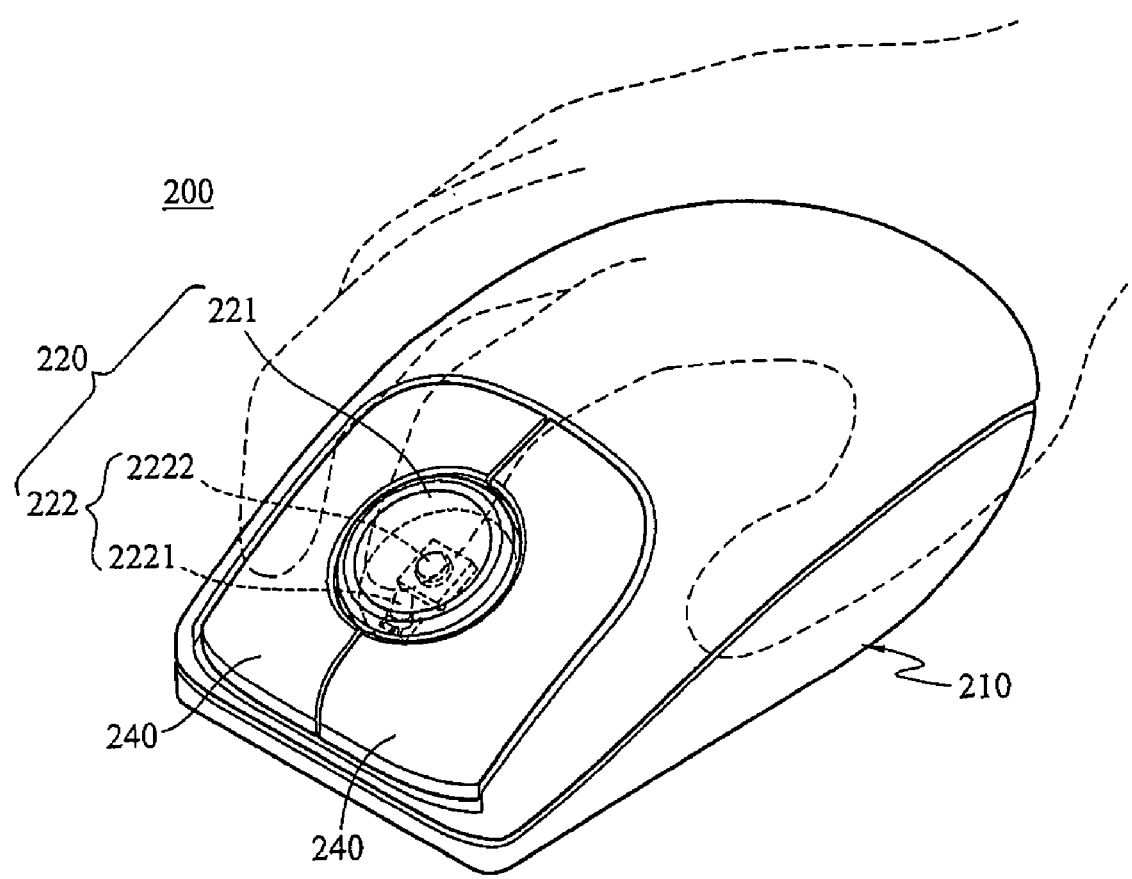
FIG. 3 is perspective view of the input device.
Figure 4:
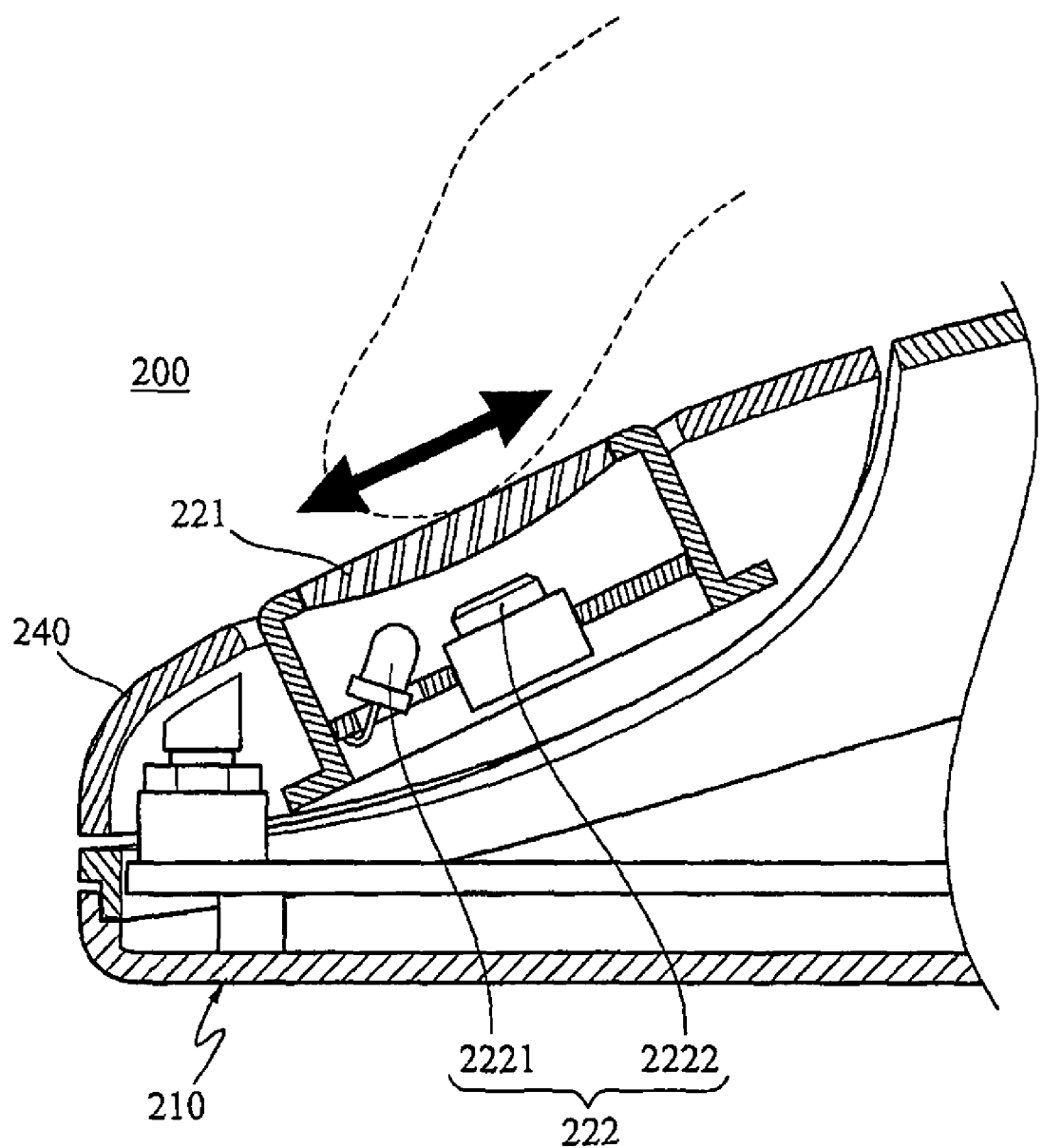
FIG. 4 is a sectional view of the input device.

Referring to FIGS. 2-4, a computer input device 200 of a preferred embodiment can scroll an application 310 on the display of a computer 300. The input device 200 comprises a body 210 and a trace-detecting module 220 on the body 210. The body 210 has a plurality of buttons 240, and a micro control unit (MCU) 230 within the body 210. The MCU 230 couples to the trace-detecting module 220 at one end and to the buttons at other ends. It is appreciated that the MCU 230 may further couple to a so-called "coordinate detecting module" for detecting the movement of the mouse so as to control the movement of a cursor on the computer display. The trace-detecting module 220 according to the embodiment of the present invention has at least a light pervious area 221, and a trace-detecting unit 222. The trace-detecting unit 222 further has at least a light source 2221, and a sensor 2222.

Figure 1:
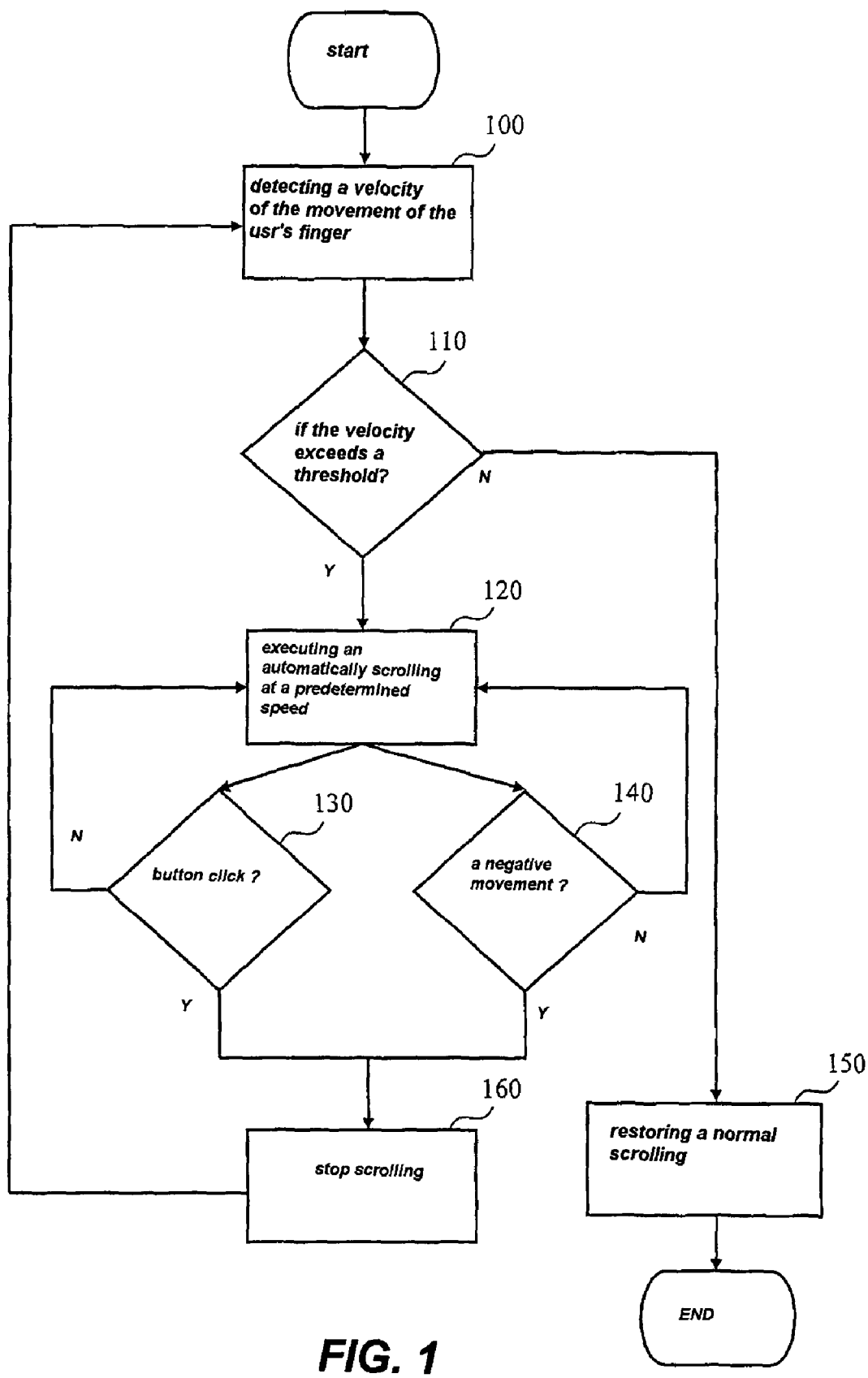
FIG. 1 is a flow chart according to the present invention.

Referring to FIG. 1, the light source 2221 projects a light beam to the light pervious area 221, and the sensor 2222 detects a light beam reflected by an object, such as the user's digit or finger. Normal line-by-line or page-by-page scrolling based on detected movement of the object is carried out if the velocity at which the object moves on the light pervious area 221 can be detected by the sensor 2222 (step 100). In addition, the MCU 230 has a threshold which is compared with the velocity. If the velocity exceeds the threshold (step 110), the MCU 230 executes automatic scrolling at a predetermined scrolling speed (step 120). The scrolling speed can be determined by the user through software such as a driver program. If the user's finger conducts a negative movement opposing to the previous movement, the MCU 230 will immediately stop the automatic scrolling (step 140). Alternatively, if the user clicks one of the plurality of buttons 240, the MCU 230 will immediately stop the automatically scrolling as well. Thereafter, the scrolling function will be restored to a normal one (step 150) i.e. line-by-line or page-by-page.

It is appreciated that the light pervious area 221 can be a lens, a transparent platform or the like which opposes to the sensor. However, it is preferred to adopt a convex lens as mentioned in United States Patent Publication No. 2005/0024335. It is understood that If the user moves his fingers on the light pervious area 221 from up (left) to down (right), the application will be scrolled from up (left) to down (right).

As to the sensor 2222, the sensor can be an image sensor such as the one disclosed in United States Patent Publication No. 2005/0024335 or a radiation sensor such as the one disclosed in U.S. Pat. No. 6,872,931, so long as the sensor 2222 is capable of sensing the movement of an object such as a user's finger or digit.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A computer input device, comprising:
   a body and a movement-detecting module coupled to the body, said movement-detecting module being a trace-detecting module that measures the velocity of a moving object,
   wherein when the velocity exceeds said predetermined threshold, the movement-detecting module generates a signal that causes automatic scrolling at a predetermined speed,
   wherein the body has a micro control unit, and the trace-detecting module has at least a light pervious area and a trace-detecting unit; the trace-detecting unit further having at least a light source, and a sensor; and
   wherein the light source projects a light beam to the light pervious area, and the sensor detects a reflected light beam; a velocity of the object on the light pervious area being sensed by the sensor.

2. The computer input device as claimed in claim 1, wherein when the velocity is less than the predetermined threshold, the trace-detecting module generates a scrolling signal based on the detected velocity.

3. The computer input device as claimed in claim 1, wherein the object is a user's digit.

4. The computer input device as claimed in claim 1, wherein the light pervious area is a lens opposing to the sensor.

5. The computer input device as claimed in claim 4, wherein the lens is a convex lens.

6. The computer input device as claimed in claim 1, wherein the sensor is an image sensor or a radiation sensor for sensing variation of the reflected light beam from the digit's movement.

7. The computer input device as claimed in claim 1, wherein a negative movement of the user's digit stops the automatically scrolling.

8. The computer input device as claimed in claim 1, wherein one of the plurality of buttons click stops the automatically scrolling.

9. The computer input device as claimed in claim 1, wherein said movement-detecting module is arranged to detect movement of a scroll wheel.

10. A method for scrolling an application on a computer display by a computer input device, comprising the steps of:
    detecting a velocity of an object; and if the velocity exceeds a predetermined threshold, executing an automatic scrolling at a predetermined scrolling speed, wherein the computer input device has at least a light pervious area, a light source and a sensor for detecting the velocity, and a micro control unit that stores the predetermined threshold and compares it with detected velocity.

11. The method as claimed in claim 10, further comprising the step of, when the velocity does not exceed the predetermined threshold, generating a scrolling signal based on the detected velocity.

12. The method as claimed in claim 10, wherein the object is a user's finger.

13. The method as claimed in claim 10, wherein a negative movement of the user's digit stops the automatically scrolling.

14. The method as claimed in claim 10, wherein a button click of the computer input device stops the automatically scrolling.

15. The method as claimed in claim 10, wherein the step of detecting the velocity of an object comprises the step of detecting movement of a scroll wheel.

16. A method for scrolling an application on a computer display by a computer input device, comprising the steps of:
    detecting a velocity of an object; and if the velocity exceeds a predetermined threshold, executing an automatic scrolling at a predetermined scrolling speed,
    wherein the velocity is determined by the variation of a reflected light beam from the object's movement.

17. The method as claimed in claim 16, further comprising the step of, when the velocity does not exceed the predetermined threshold, generating a scrolling signal based on the detected velocity.

18. The method as claimed in claim 16, wherein the object is a user's finger.

19. The method as claimed in claim 16, wherein a negative movement of the user's digit stops the automatically scrolling.

20. The method as claimed in claim 16, wherein a button click of the computer input device stops the automatically scrolling.

21. The method as claimed in claim 16, wherein the step of detecting the velocity of an object comprises the step of detecting movement of a scroll wheel.

* * * * *